United States Patent [19]

Tallentire et al.

[11] Patent Number: 5,695,871
[45] Date of Patent: Dec. 9, 1997

[54] REDUCTION OF OPENNESS OF MATERIAL

[75] Inventors: Alan Tallentire, Cheshire; Colin Samuel Sinclair, Manchester, both of United Kingdom

[73] Assignee: The Victoria University of Manchester, Manchester, United Kingdom

[21] Appl. No.: 557,094

[22] PCT Filed: Jun. 8, 1994

[86] PCT No.: PCT/GB94/01236

§ 371 Date: May 15, 1996

§ 102(e) Date: May 15, 1996

[87] PCT Pub. No.: WO94/29525

PCT Pub. Date: Dec. 22, 1994

[30] Foreign Application Priority Data

Jun. 10, 1993 [GB] United Kingdom ............... 9311946

[51] Int. Cl.$^6$ ............... B32B 3/26; B32B 19/00; B05D 5/00; D02G 3/00

[52] U.S. Cl. ............... 428/320.2; 427/198; 427/244; 427/245; 427/373; 428/35.7; 428/306.6; 428/357; 428/361; 428/378; 428/322.7

[58] Field of Search ............... 427/180, 198, 427/244, 212, 222, 373, 245, 202, 203; 428/35.7, 36.1, 36.5, 306.6, 320.2, 322.7, 361, 378, 365, 357

[56] References Cited

U.S. PATENT DOCUMENTS

| | | | |
|---|---|---|---|
| 3,676,288 | 7/1972 | Hoyle | 156/77 |
| 4,055,248 | 10/1977 | Marsan | 427/242 |
| 4,582,756 | 4/1986 | Niinuma et al. | 427/221 |
| 4,747,346 | 5/1988 | Geel | 427/212 |
| 4,814,083 | 3/1989 | Ford et al. | 210/490 |
| 4,818,600 | 4/1989 | Braun et al. | 428/334 |
| 4,836,871 | 6/1989 | Kato | 427/244 |
| 4,855,170 | 8/1989 | Darvell et al. | 428/343 |
| 4,879,163 | 11/1989 | Woiceshyn | 156/276 |
| 4,902,722 | 2/1990 | Melber | 427/222 |
| 5,155,138 | 10/1992 | Lundqvists | 521/76 |
| 5,234,757 | 8/1993 | Wong | 428/311.11 |
| 5,356,683 | 10/1994 | Egolf et al. | 427/222 |
| 5,389,166 | 2/1995 | White | 156/93 |
| 5,391,424 | 2/1995 | Kolzer | 427/180 |

*Primary Examiner*—Diana Dudash
*Attorney, Agent, or Firm*—Larson & Taylor

[57] ABSTRACT

A material, which may have a highly open structure such that it has negligible barrier properties, is treated with expandable particles. These are then caused to expand within the material, reducing its openness and improving its barrier properties. The product may be a porous material. The pores may be modified by an agent applied together with the particles or after the expansion. The particles may be thermoplastic microspheres containing gas. The material may be a network material, with a fiber matrix with many voids.

22 Claims, 9 Drawing Sheets

REDUCTION OF OPENNESS OF MATERIAL

The present invention relates to the reduction of openness of material so as to reduce the number and/or size of voids. It particularly relates to the treatment of air permeable materials, especially ones which have comparatively open structures which are thereby made less open. The invention also relates to treated material.

The present inventors have previously devised a method of treating a porous material by selectively passing a suspension of a pore modifying agent into its largest pores. Thus EP-A-0,272,798 discloses a process for enhancing barrier properties by creating zones of high surface area within the large, or transport, pores. This can be arranged to have little or no effect on the permeability of the material. WO-A-93/14265 and WO-A-93/24705 disclose further techniques based on selective deposition of treatment agents within the transport pores. However, materials with very open structures do not have pores as such, and the kinds of treatment employed in the earlier work would generally leave them essentially unchanged. The present invention provides a method that can be applied to such open materials. Of course it could also be applied to less "open", more "porous" materials.

Particular examples of "open" materials to which the invention is applicable are non-consolidated (or substantially non-consolidated) fibrous materials which include or consist essentially or largely of a matrix of fibres in regular, semi-regular or random fashion. Such non-consolidated (or substantially non-consolidated) materials are referred to herein as network materials and examples include woven materials, non-woven materials, "air-blown" materials and spun-bonded materials.

The type of "open" material with which the invention is particularly concerned will generally have a voids content of at least 50%, preferably at least 75%.

The openness of a material can be quantified by the ratio of the (average) interfibre distance to the (average) fibre diameter. The ratio is low for a consolidated material, but substantially in excess of unity for an "open" material to which the present invention is particularly applicable (e.g. at least 2, preferably at least 5, possible 10 or more).

There are many uses for materials which act as a barrier to the passage of airborne particles (e.g. micro-organisms) whilst still retaining air permeability. Examples are filter media, various types of clothing, and paper and paper-type materials for use in the packaging of sterile medical items.

It is desirable to be able to produce barrier products from network materials and other materials of comparatively open structure and it is therefore an object of this invention to provide a method of reducing the openness of such materials.

In one aspect the invention provides a method of reducing the openness of an air permeable material comprising:
(a) treating it so as to incorporate expandable particles within the material; and thereafter (b) effecting expansion of the particles.

The material will normally be in the form of a web. It should be dimensionally stable. Thus the constituent elements (usually fibres) will generally be connected together, whether chemically, mechanically or physically. Thus the increase in volume of the expanding particles primarily involves their expansion into existing voids, which are thereby reduced. In contrast, if expandable particles are applied to unconnected fibres and expanded, the main effect is to push the fibres apart. The material expands and becomes, if anything, even more open.

The starting material may be a network material. After treatment, it may be a porous material. It may then undergo further, pore-modifying treatment. This may be as previously described by the present inventors in EP-A-0,272,798, WO-A-93/14265 or WO-A-93/24705, whose disclosures are incorporated herein by reference.

The materials to be treated may be wet-laid or non wet-laid materials. Particular examples of wet-laid materials which may be treated are paper and paper-type network materials. Particular examples of non wet-laid materials which may be treated are woven materials (e.g. textile), non-woven materials (e.g. textile), air blown materials and spun-bonded materials.

Generally the materials to be treated by this invention comprise constituent fibres defining an "open" structure. The expandable particles are held on the fibres of the material and expansion causes them to occupy the open spaces between the constituent fibres and hence reduce the openness thereof.

Preferably the particles are expanded by heat and are most preferably thermoplastic microspheres containing a gas, for example butane, or a vapourisable or gas-generating material. Such thermoplastic microspheres may be expanded by heating, e.g. at approximately 80° C. so as to soften the thermoplastic wall of the sphere and allow expansion under the gas pressure.

The size of the expandable particles to be used can be selected having regard to the openness of the material treated. For example, we have used thermoplastics microspheres with a size of approximately 10 μm diameter which give a 4-fold expansion in diameter on heating. These figures are however purely exemplary; other sizes of microsphere and degrees of expansion could be used. If the particles are too small, they will tend to be carried on a gas stream passing through the material, and not remain within the material. Simple experiments can be used to find a size range suitable for treating a particular material. Thus a material can be given the treatment and expansion steps and then examined microscopically and/or its permeance or barrier properties can be assessed.

The expandable particles may be of a uniform size, of a predetermined size distribution, or of random size.

The expandable particles may be incorporated in the material by establishing a pressure differential across the material and treating the higher pressure side of the material with a suspension or dispersion in air (or other gas) of the expandable particles. During this treatment, the expandable particles are caught by, and held on, the fibres of the material. These particles may subsequently be expanded so as to occupy a significant proportion of the open space between the fibres of the material and thereby reduce its openness. The extent of the reduction may be dependent on such factors as the size of the expanded particles and the number located within the material. Generally, the treatment is effected so as to produce a material which permits the passage of gases and vapours but acts as an improved barrier to airborne particles. It is of course possible to effect more than one treatment in accordance with the method of the invention on any one material.

The treated material may itself have sufficient barrier properties for certain application. However materials produced by the method of the invention may have pores with a range of sizes and may be treated to incorporate a pore modifying agent in the pores to the upper end of the size range so as to restrict the passage of airborne particles through these pores whilst the pores at the lower end of the size range incorporate substantially none of the pore modifying agent. This second treatment may be effected by the method disclosed in EP-A-0272798.

It is also within the scope of the invention to treat the material, in step (a), with a mixture of expandable particles and a pore modifying agent. This may avoid the need for two separate treatment stages mentioned in the preceding paragraph. The agent may be one which combines with the microspheres to act as a binder and/or to provide a surface coat on the expanded microspheres. It is preferable if the agent has film-forming properties under the conditions (particularly the temperature) of the expansion step. A latex may be used.

Some examples of the invention will now be described in greater detail with reference to the accompanying drawings.

Figure 1:
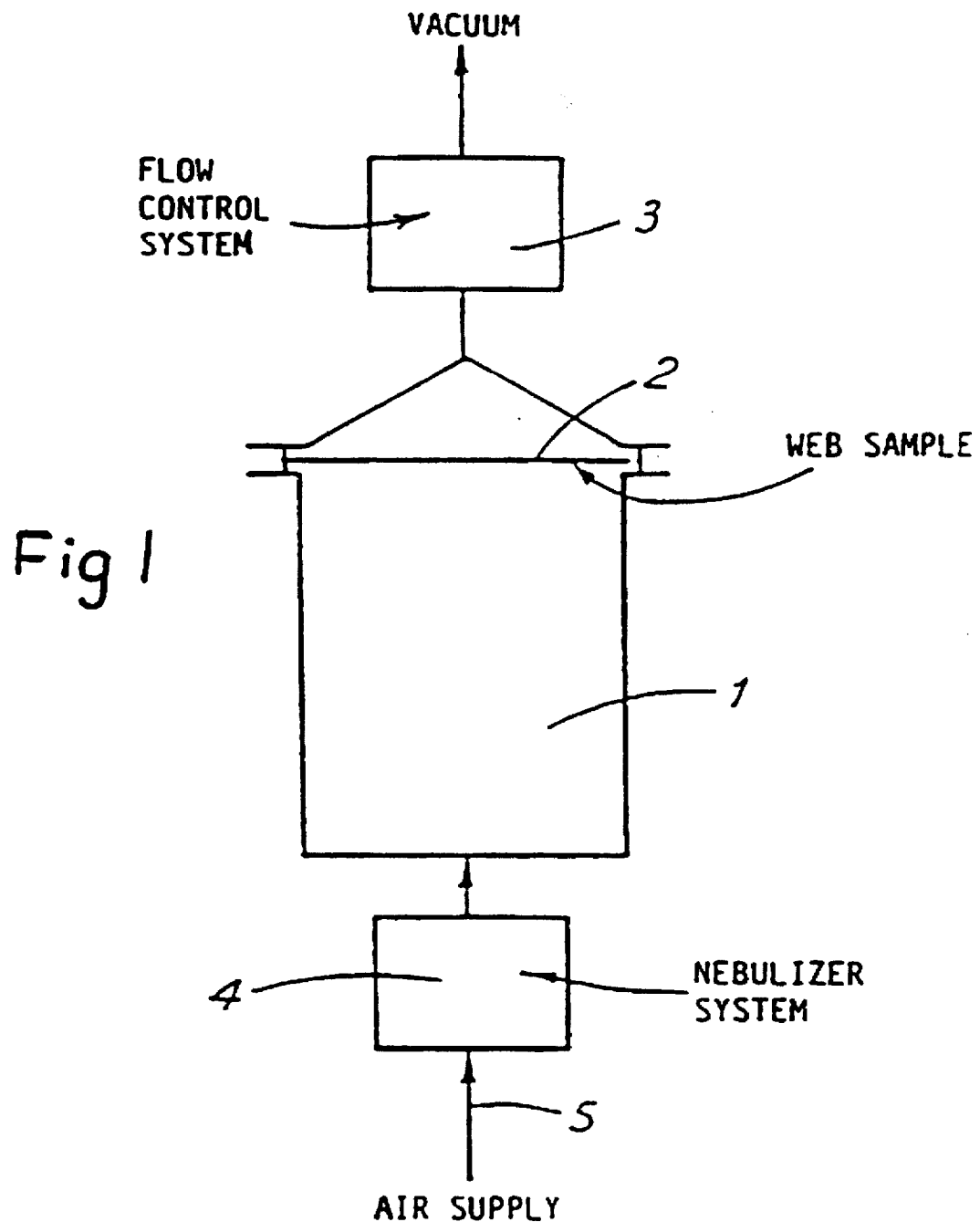
FIG. 1 is a schematic view of apparatus used for incorporating expandable particles into a web of material.
Figure 2:
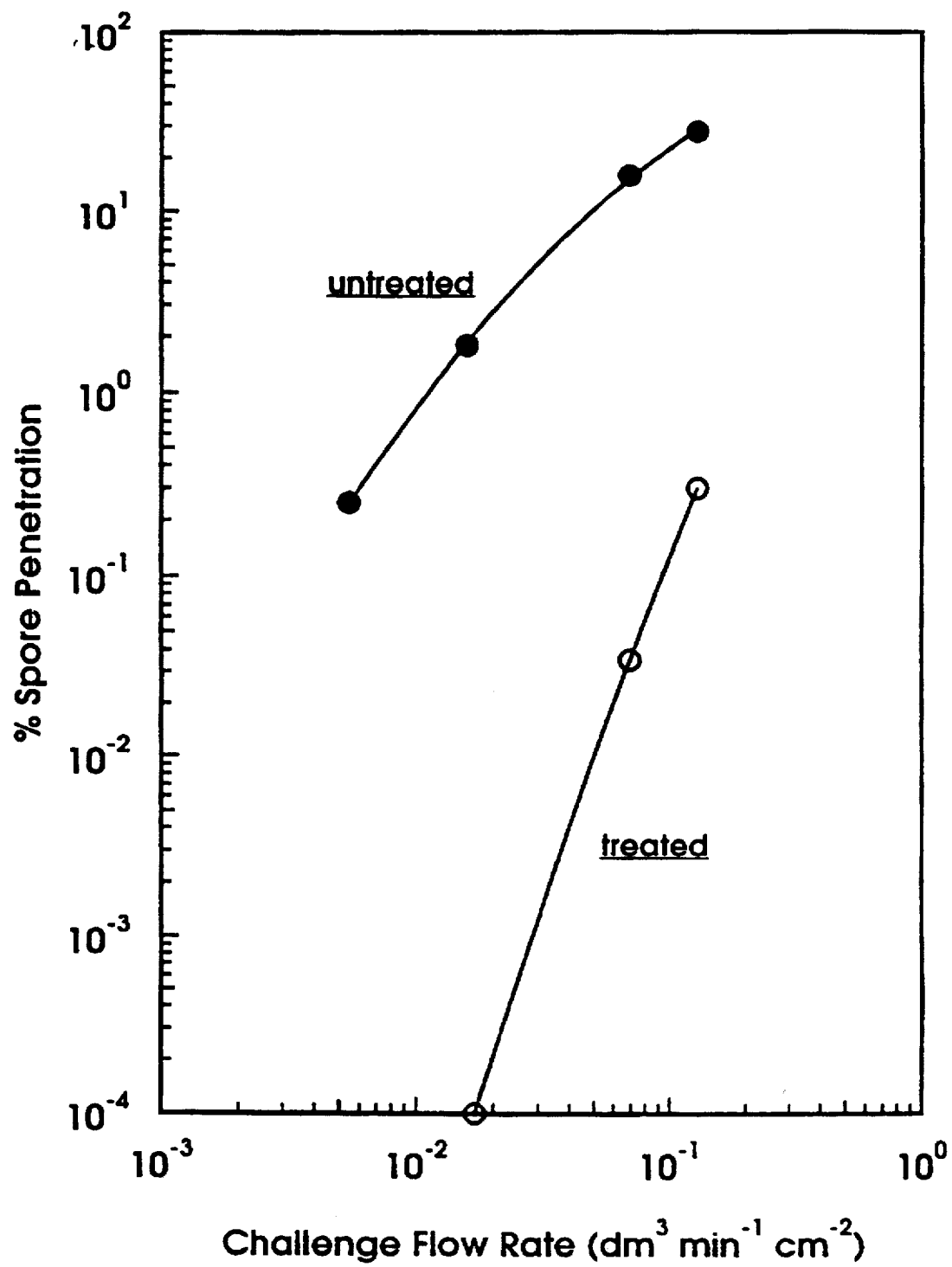
FIG. 2 is a graph showing how treatment affects the penetrability of a material by bacterial spores.
Figure 3:
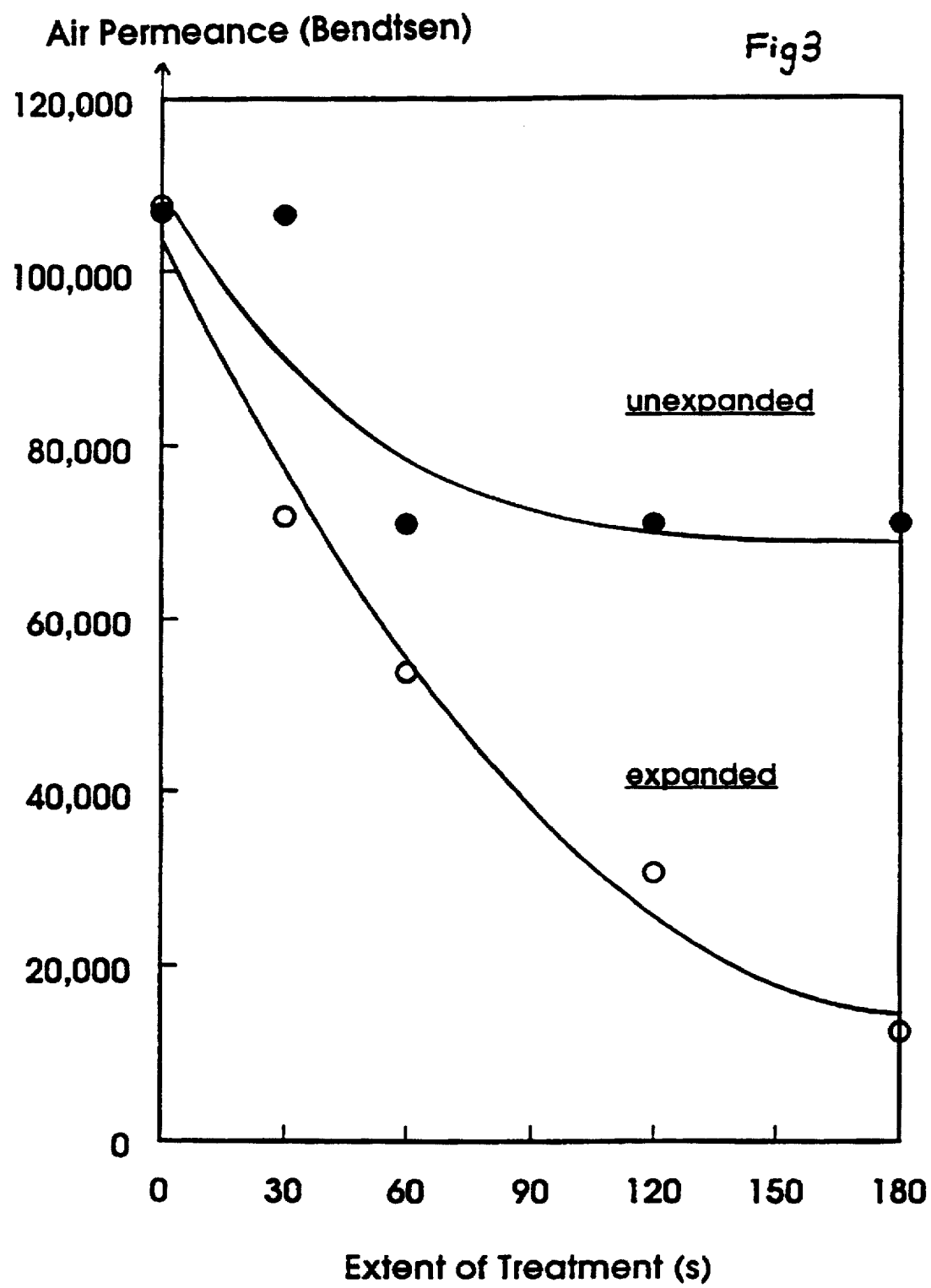
FIG. 3 is a graph of air permeance vs extent of treatment.
Figure 4:
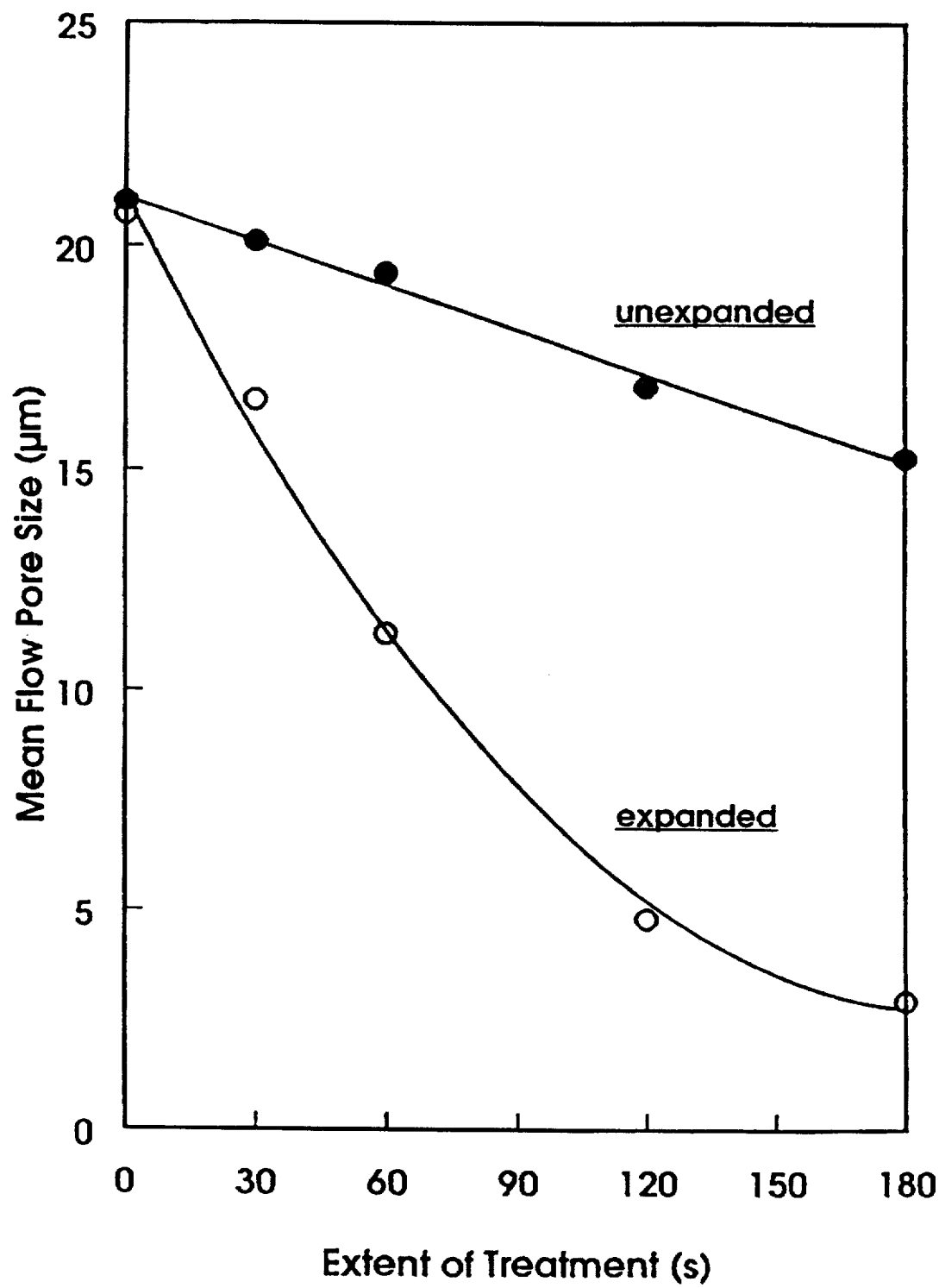
FIG. 4 is a graph of mean flow pore size vs extent of treatment.
Figure 5:
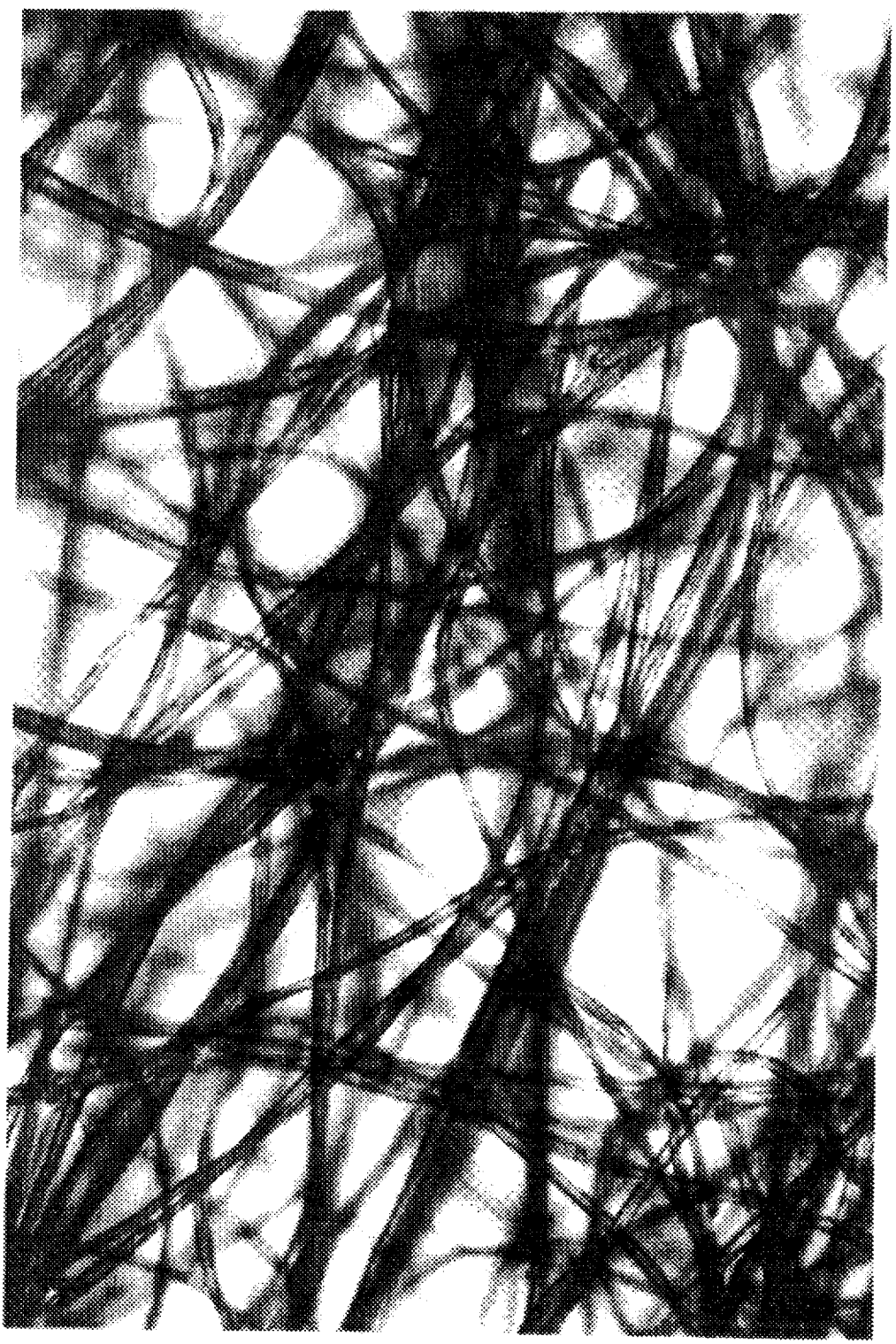
FIG. 5 is a photomicrograph of a non-woven polypropylene web.
Figure 6:
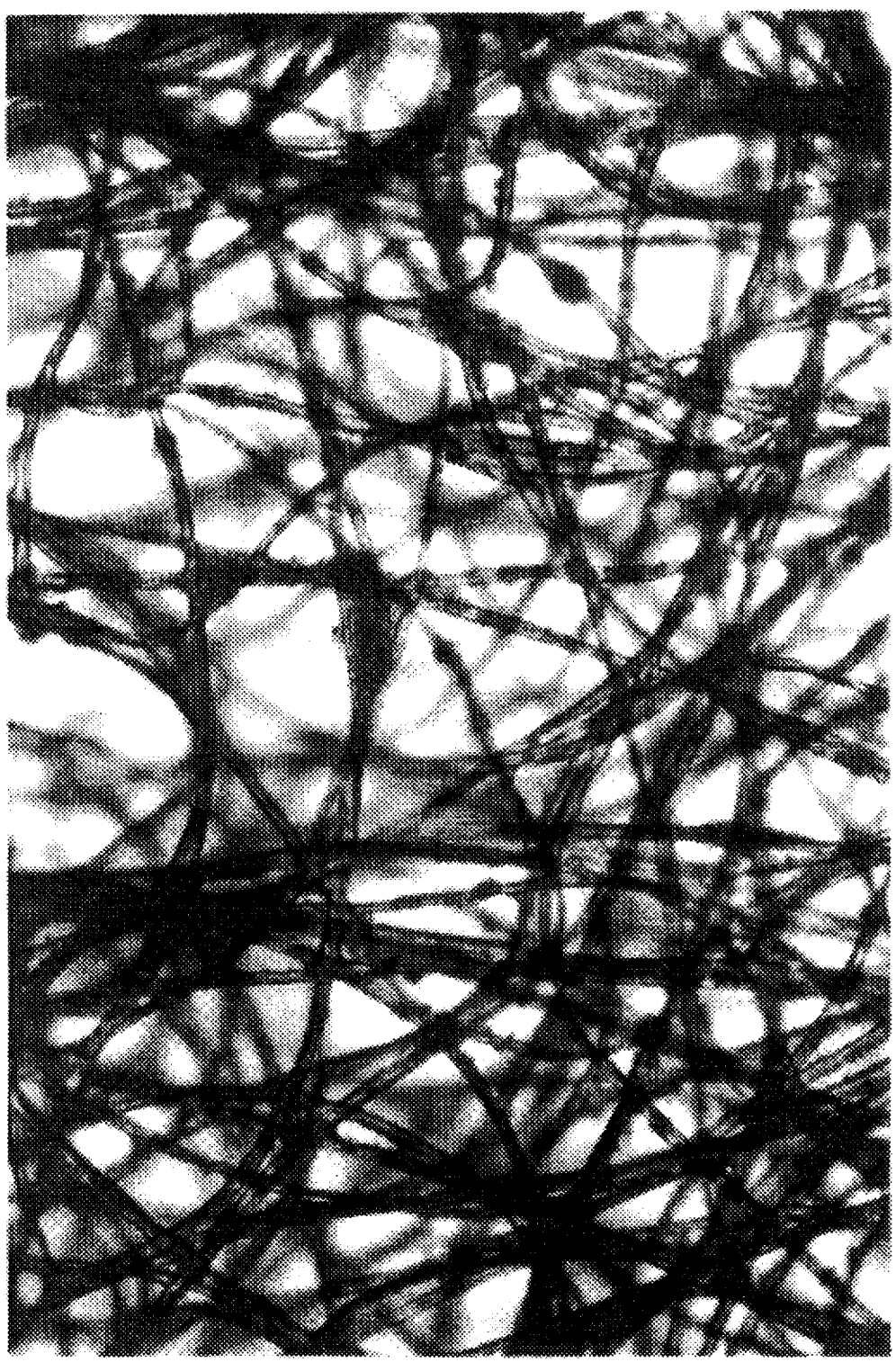
FIG. 6 is a photomicrograph of the web shown in FIG. 5 after the application of microspheres.
Figure 7:
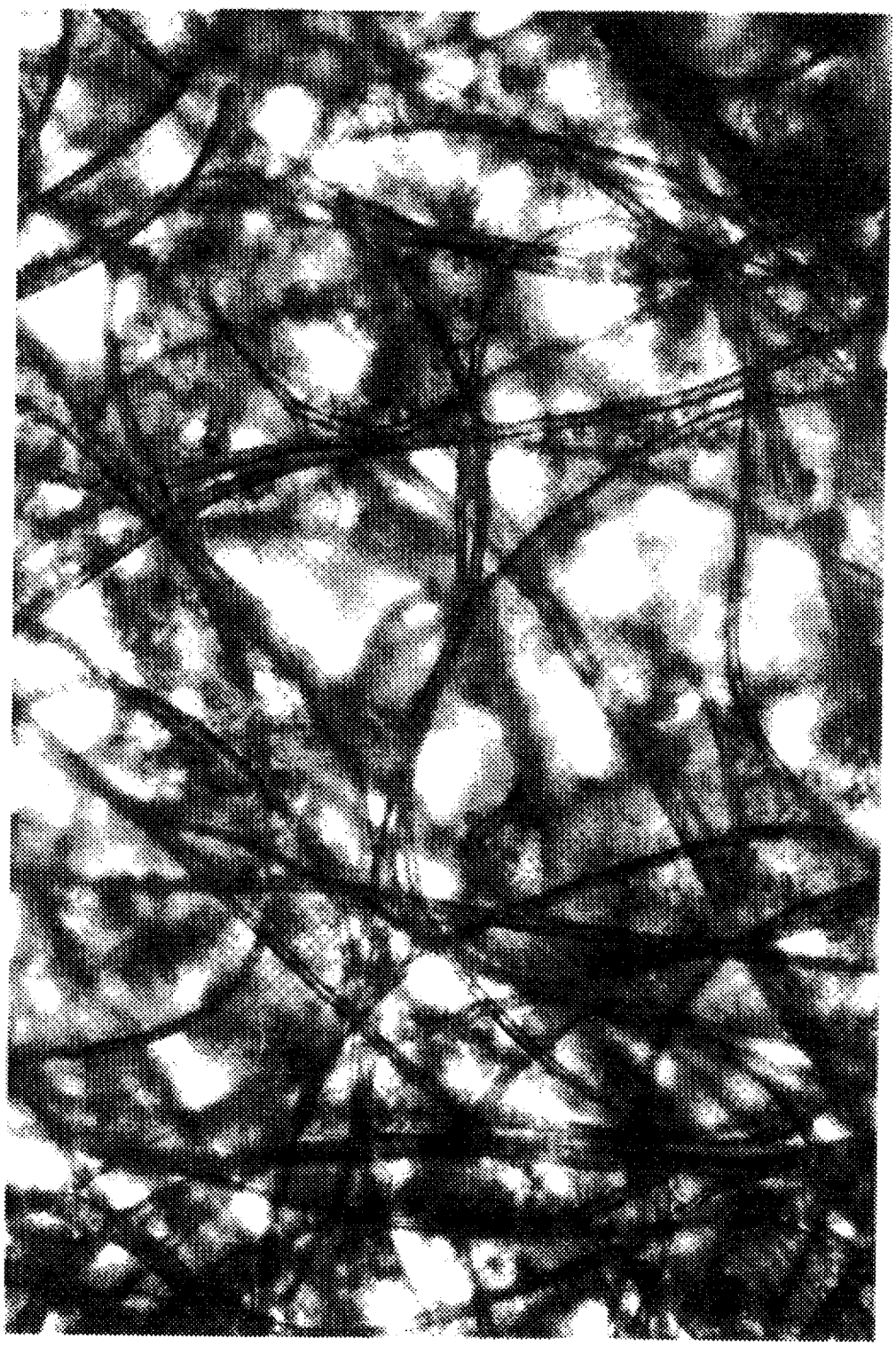
FIG. 7 is a photomicrograph showing the web of FIG. 6 after expansion of the microspheres.
Figure 8:
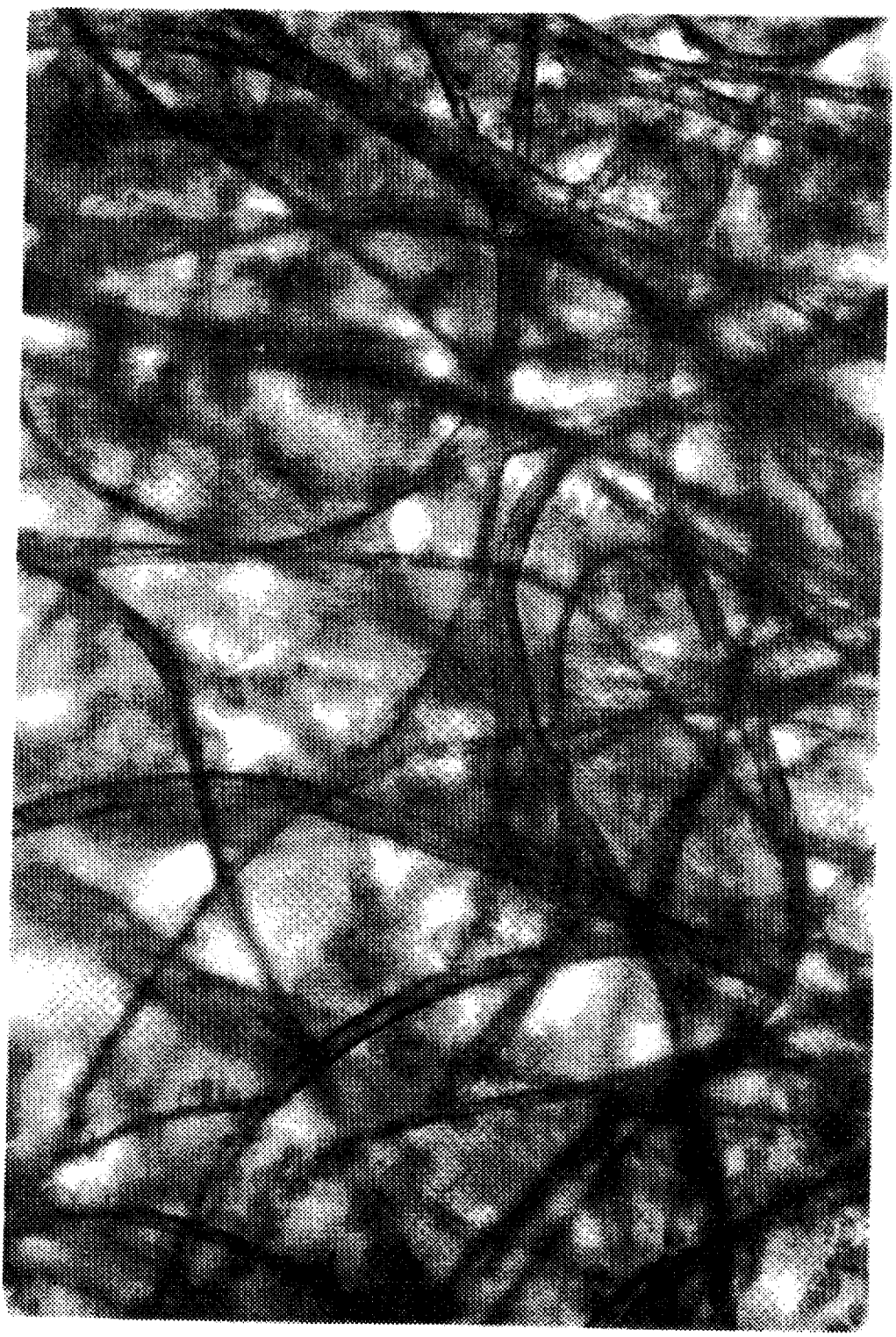
FIG. 8 is a view similar to that of FIG. 7 but showing a web having a larger content of expanded microspheres.
Figure 9:
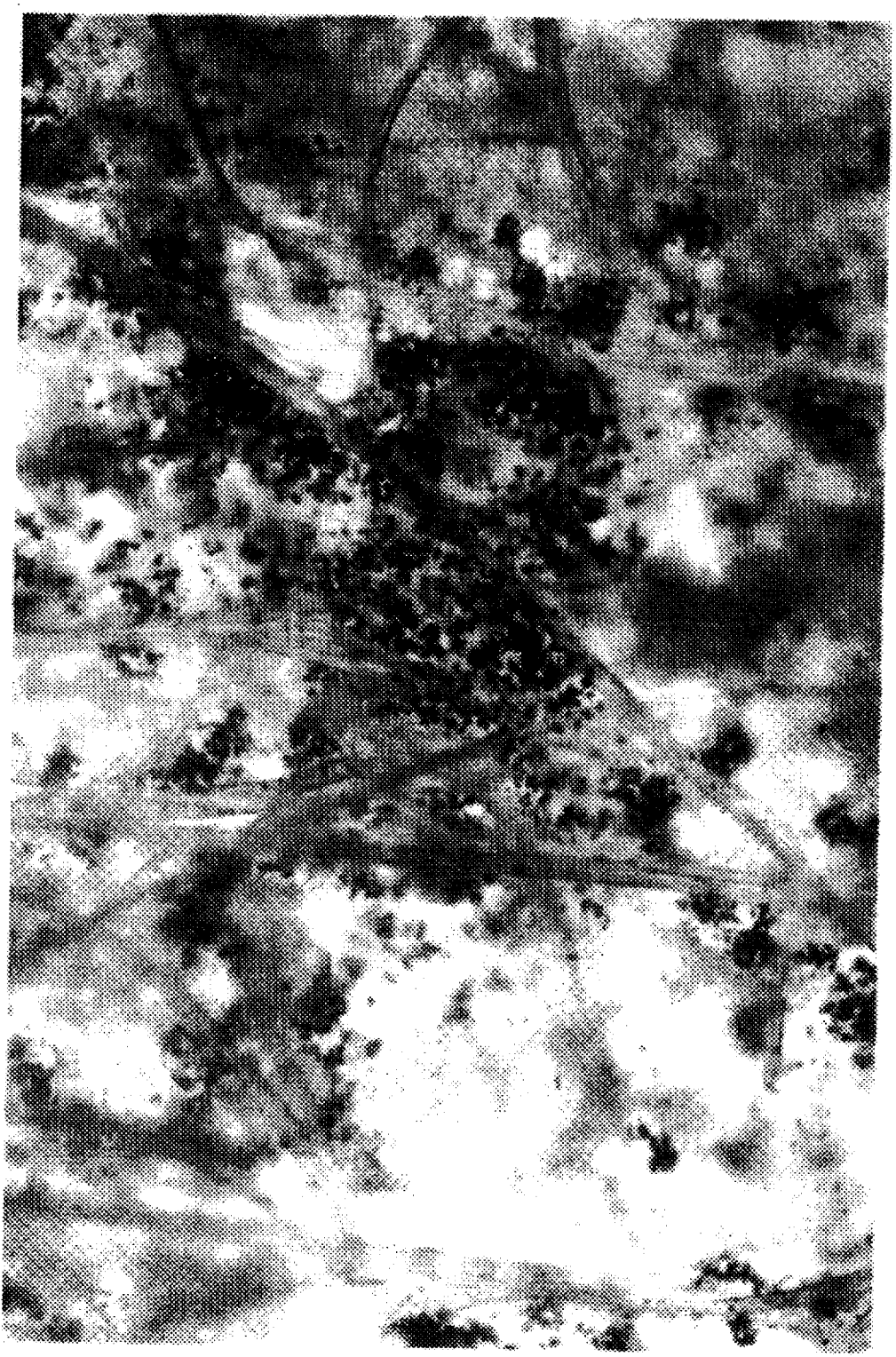
FIG. 9 shows the web of FIG. 7 after use to filter dye particles from an air stream.

A suitable apparatus for effecting the treatment of a web of starting material is that disclosed in FIG. 1 and described in EP-A-0.272.798. It comprises a treatment chamber 1 in which a sample 2 of material to be treated is supported as shown. A flow control system 3 serves to establish a pressure differential across the material 2. A Hudson nebuliser 4 associated with an air supply line 5 is provided at the other side. In use, an aerosol is generated in the nebuliser 4 and is drawn through the material 2 by virtue of the applied vacuum.

The following examples were carried out using the apparatus illustrated in FIG. 1 working under the following conditions:

input pressure to the nebuliser 20 psi sample size of material 78.5 $cm^2$ rate of flows across the material 10 $dm^3\ min^{-1}$ The microspheres were those marketed by Nobel Industries (Sweden) under the trade name EXPANCEL. They consist of thermoplastic hollow spheres containing isobutane.

EXAMPLE 1

The starting material was a 100 $gm^{-2}$ non-woven polypropylene material of air permeance 80,000 Bendtsen. This material, designated web A, was treated for 30 s with an aerosol generated by the nebuliser from a 40% w/v suspension of microspheres in water. The sample was then exposed to steam to effect expansion of entrapped microspheres. FIG. 2 shows the behaviour of untreated and treated web A when challenged with airborne spores of *Bacillus subtilis* flowing at rates within the range $10^{-3}$ to $10^{-1}$ $dm^3\ min^{-1}\ cm^{-2}$. It is evident from FIG. 2 that, at the different flow rates examined, % spore penetration is lower for the treated web as opposed to the untreated web A. (The extent of the barrier improvement ranges from around $10^4$ to $10^2$ fold for flow rates $1.8\times10^{-2}$ and $1.3\times10^{-1}$ $dm^3\ min^{-1}\ cm^{-2}$ respectively).

FIGS. 5–9 are enlarged pictures of web A after various treatments.

FIG. 5 shows the starting material. It has a 3-dimensional structure, with large voids between generally uniform fibres.

FIG. 6 shows the material after the application of microspheres, which are visible as darkened thickenings on fibres. FIG. 7 shows similar material after expansion of the microspheres. FIG. 8 is a similar view showing material that was more heavily treated.

FIG. 9 shows material as seen in FIG. 7 which has been used to filter methylene blue particles from an air stream. The dark patches are captured particles of the dye. In fact the untreated material shown in FIG. 5 had also been treated with methylene blue under similar conditions, but there is no evidence that any was caught. Thus it is clear that treatment according to the invention has conferred barrier properties.

EXAMPLE 2

A 60 $gm^{-2}$ non-woven, air-laid cellulosic web (designated web B) was treated for various times with an aerosol generated from a suspension of microspheres combined with a pore modifying agent (latex particles). The formulation of the suspension is given below.

expandable microspheres 10% w/v latex particles 10% w/v water to 100%

FIG. 3 is a plot of air permeance vs extent of treatment for web B. Solid points represent data generated for samples with no expansion of the microspheres and open points represent data generated for samples following expansion of microspheres by exposure to steam. This plot shows that, without expansion of the microspheres, incorporating the combination of the two agents into web B results in a small reduction in air permeance of web B (around a 1.5 fold reduction for 180 s treatment). However, with expansion of the microspheres, air permeance is observed to fall rapidly with increasing level of treatment (around a 9 fold reduction in air permeance for 180 s treatment). This marked reduction in air permeance on expansion of the microspheres is a consequence of a reduction in the openness of web B.

FIG. 4 is a plot of mean flow pore size vs extent of treatment for web B. (As in FIG. 3 solid points represent data generated for samples with no expansion of the microspheres and open points for samples following microsphere expansion via exposure to steam.) In keeping with the response for air permeance, a small reduction in mean flow pore size is observed without microsphere expansion (around 1.3 fold reduction for 180 s treatment). In contrast, with microsphere expansion, there is a marked decrease in mean flow pore size with increasing level of treatment (around 7.2 fold for 180 s treatment). Again, the response of mean flow pore size on microsphere expansion is in keeping with a reduction in the openness of web B.

Table 1 lists barrier data generated for web B treated with the combination of microspheres and pore modifying agent. (The table lists data generated for web B with and without microsphere expansion.) In table 1, the percent penetration of airborne particles of sizes greater than 0.5, 1 and 2 μm are given at a fixed challenge flow rate of 0.36 $dm^3\ min^{-1}\ cm^{-2}$. Without microsphere expansion, little or no barrier improvement is seen at the 0.5 μm particle size and, for the largest particle size threshold (i.e. 2 μm), only a modest reduction is observed in penetration (around 1.4 fold for a treatment of 180 s). However, with microsphere expansion, a substantial reduction in percent penetration is observed at all three particle size thresholds. At 0.5 μm particle size threshold, % penetration is seen to fall from around 75 to 5% (i.e. 15 fold improvement) for 180 s treatment and, at the 2 μm threshold, % penetration falls from around 43 to 0%. Clearly, reduction in the openness of web B, consequent upon microsphere expansion, provides for a substantial improvement in barrier performance.

TABLE 1

| | Web B (60 gm$^{-2}$) | | | | | |
|---|---|---|---|---|---|---|
| Extent of Treatment | Unexpanded % Penetration | | | Expanded % Penetration | | |
| (s) | >0.5 μm | >1 μm | >2 μm | >0.5 μm | >1 μm | >2 μm |
| 0 | 77 | 60 | 40 | 75 | 54 | 43 |
| 30 | 79 | 64 | 41 | 67 | 36 | 25 |
| 60 | 77 | 56 | 20 | 57 | 25 | 14 |
| 120 | 77 | 63 | 26 | 23 | 4.2 | 2 |
| 180 | 78 | 54 | 29 | 5 | 1 | 0 |

We claim:

1. A method of reducing the openness of a dimensionally stable web of an air permeable material comprising:
   (a) treating it so as to incorporate expandable particles within the material; and thereafter
   (b) effecting expansion of the particles so that they expand into existing voids which are thereby reduced to produce a material which permits the passage of gases and vapors but acts as an improved barrier to airborne particles.

2. A method according to claim 1, wherein the web is composed of fibers which are connected together, thus conferring dimensional stability.

3. A method according to claim 1, wherein the material comprises a matrix of fibers, and the treatment is effected so as to attach the particles to the fibers within the material.

4. A method according to claim 1, wherein, prior to treatment, the material has a voids content of at least 50%.

5. A method according to claim 1, wherein, prior to treatment, the material has a voids content of at least 75%.

6. A method according to claim 1, wherein, prior to treatment, the material comprises fibers disposed so that the ratio of the average interfiber distance to the average interfiber diameter is at least 2.

7. A method as claimed in claim 1, wherein the material prior to treatment is a network material.

8. A method as claimed in claim 1, wherein the material has been produced by a non wet-laying technique.

9. A method as claimed in claim 8, wherein the material is woven material, non-woven material, air blown material, or spun-bonded material.

10. A method as claimed in claim 1, wherein the material has been produced by a wet-laying technique.

11. A method as claimed in claim 10, wherein the material is a paper.

12. A method as claimed in claim 1, wherein the particles are expanded by heat.

13. A method as claimed in claim 1, wherein the particles are thermoplastic atmospheres containing gas.

14. A method as claimed in claim 1, wherein the particles are incorporated in the material by establishing a pressure differential across the material so that the material has a high pressure side and a low pressure side and treating the higher pressure side of the material with said particles in a carrier fluid.

15. A method according to claim 14 which the carrier fluid is a gas.

16. A method as claimed in claim 1, including incorporating a pore modifying agent which affects the properties of the resulting pores.

17. A method according to claim 16, wherein the agent is a latex which forms on the pore surfaces.

18. A method as claimed in claim 1, wherein after expansion of the particles the material is further treated with a pore modifying agent.

19. A method according to claim 18, wherein the further treatment effects selective deposition of the agent in the larger pores to provide regions of relatively high surface area therein and thereby enhances the barrier properties of the material.

20. A method according to claim 18, wherein the further treatment effects selective deposition of the agent in the larger pores; and wherein the agent is selected from particulate materials which, when selectively incorporated, affect a property of the web selected from:
   (i) pore size distribution and one or more characteristics related thereto selected from:
      pressure to cause liquid to pass through the material;
      liquid filtration properties;
      resistance to penetration to grease;
      vapor transmission;
      printability;
      coating;
      variability of any of the above between different samples of the web material;
      variability of maximum pore size between different samples of the web material;
   (ii) light scattering, the agent being a light scattering agent;
   (iii) ion exchange properties, the agent being an ion exchange resin;
   (iv) catalytic properties, the agent being a catalyst;
   (v) detectable marking or coloring, the agent being a pigment, dye, or other marking agent;
   (vi) response to calendaring;
   (vii) deodorizing ability, the agent being an odor removing agent;
   (viii) adhesion properties, the agent being an adhesive agent;
   (ix) absorption properties, the agent being an absorbent agent;
   (x) electrical conductivity.

21. A method according to claim 18 wherein the further treatment effects selective deposition of the agent in the larger pores; said agent being applied in the form of droplets of a liquid, under conditions such that the droplets are spread to provide surface coatings within pores.

22. A material produced by applying the method of claim 1 to a dimensionally stable web of an air-permeable starting material.

* * * * *